United States Patent [19]
Beck et al.

[11] Patent Number: 5,440,739
[45] Date of Patent: Aug. 8, 1995

[54] METHOD OF MAINTAINING UPDATED SET-UP CONFIGURATIONS IN WORKGROUPS ON A NETWORK

[75] Inventors: Robert E. Beck, Arlington Heights; Ronald L. Schoenberger, Clarendon Hills, both of Ill.

[73] Assignee: Beck Systems, Inc., Chicago, Ill.

[21] Appl. No.: 898,191

[22] Filed: Jun. 11, 1992

[51] Int. Cl.6 .................. G06F 13/00; G06F 17/00
[52] U.S. Cl. .................. 395/650; 395/600; 364/DIG. 1; 364/230; 364/282.4
[58] Field of Search .............. 395/153, 158, 500, 600, 395/650, 200

[56] References Cited

U.S. PATENT DOCUMENTS

| | | | |
|---|---|---|---|
| 5,008,853 | 4/1991 | Bly et al. | 395/153 |
| 5,019,963 | 5/1991 | Alderson et al. | 395/600 |
| 5,228,137 | 7/1993 | Kleinerman et al. | 395/500 |
| 5,233,687 | 8/1993 | Henderson, Jr. et al. | 395/158 |
| 5,249,243 | 9/1993 | Schreiber et al. | 395/650 |
| 5,257,369 | 10/1993 | Skeen et al. | 395/650 |
| 5,276,879 | 1/1994 | Barry et al. | 395/650 |
| 5,301,270 | 4/1994 | Steinberg et al. | 395/161 |
| 5,315,711 | 5/1994 | Barone et al. | 395/275 |

OTHER PUBLICATIONS

"Info World", Dec. 30, 1991/Jan. 6, 1992, vol. 13, Issue 52/vol. 14, Issue 1, Networking, article by Mark Brownstein: *About Time Update Ships.*

Unix On-line Documentation of IBM RS6000 computer *rdist Command,* Mar. 9, 1992, 3 pgs., copyright 1990 IBM Corporation.

Unix On-line Documentation of IBM RS6000 computer *distfile* File, Mar. 9, 1992, 4 pgs., copyright 1990 IBM Corporation.

*Primary Examiner*—Thomas G. Black
*Assistant Examiner*—Wayne Amsbury
*Attorney, Agent, or Firm*—Fitch, Even, Tabin & Flannery

[57] ABSTRACT

A workgroup organized network manager for controlling the operation of individual workstations within a computer network. The workgroup organized network manager organizes workstations into workgroups and controls the distribution of information to each of the workstations within a defined workgroup. The tasks each workstation performs are defined by a specification consisting of programs. A library of programs is maintained on a host workstation designated as a controlling workstation within the workgroup. The host workstation keeps track of activity occurring on the individual workstations within the workgroup.

23 Claims, 14 Drawing Sheets

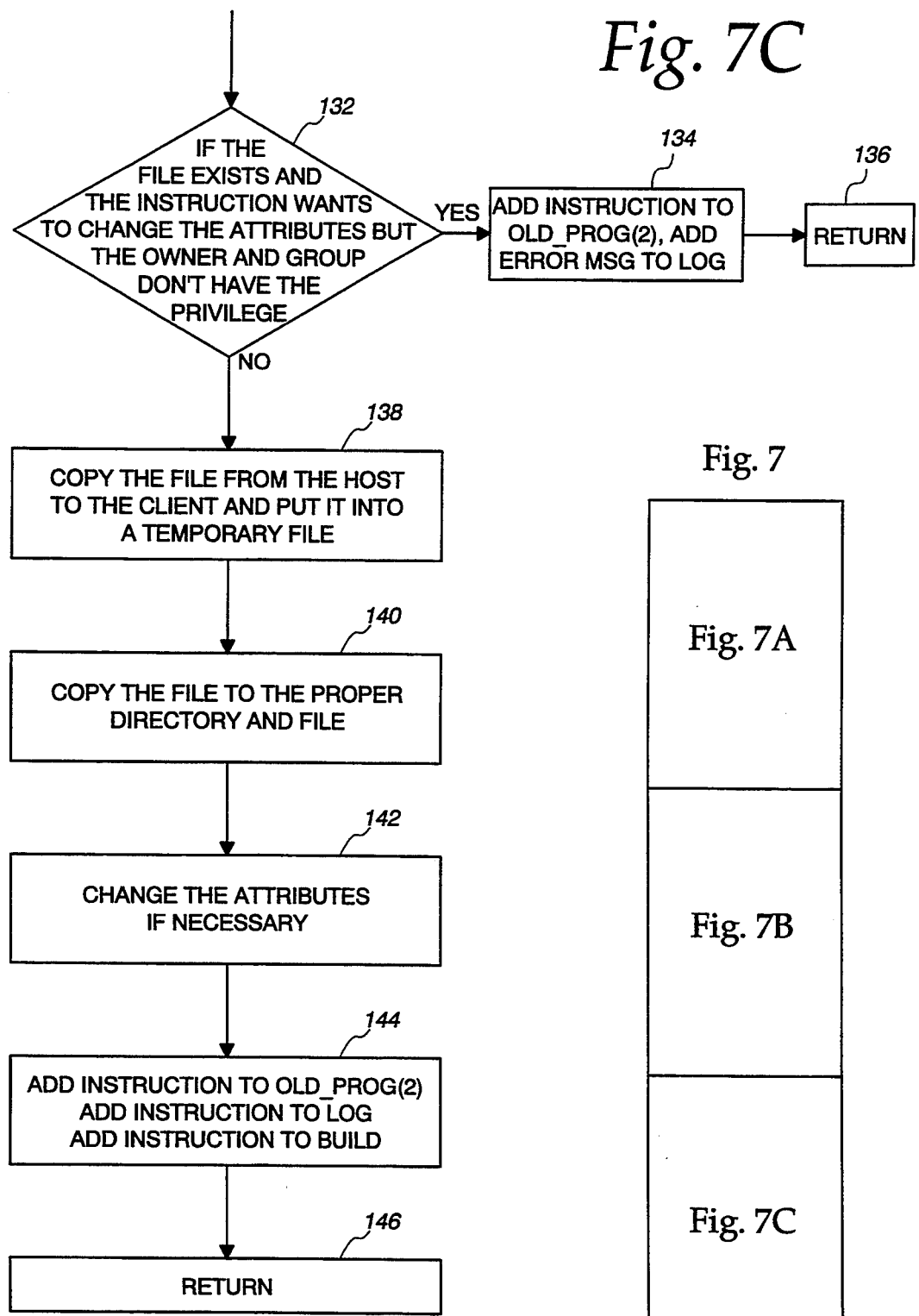

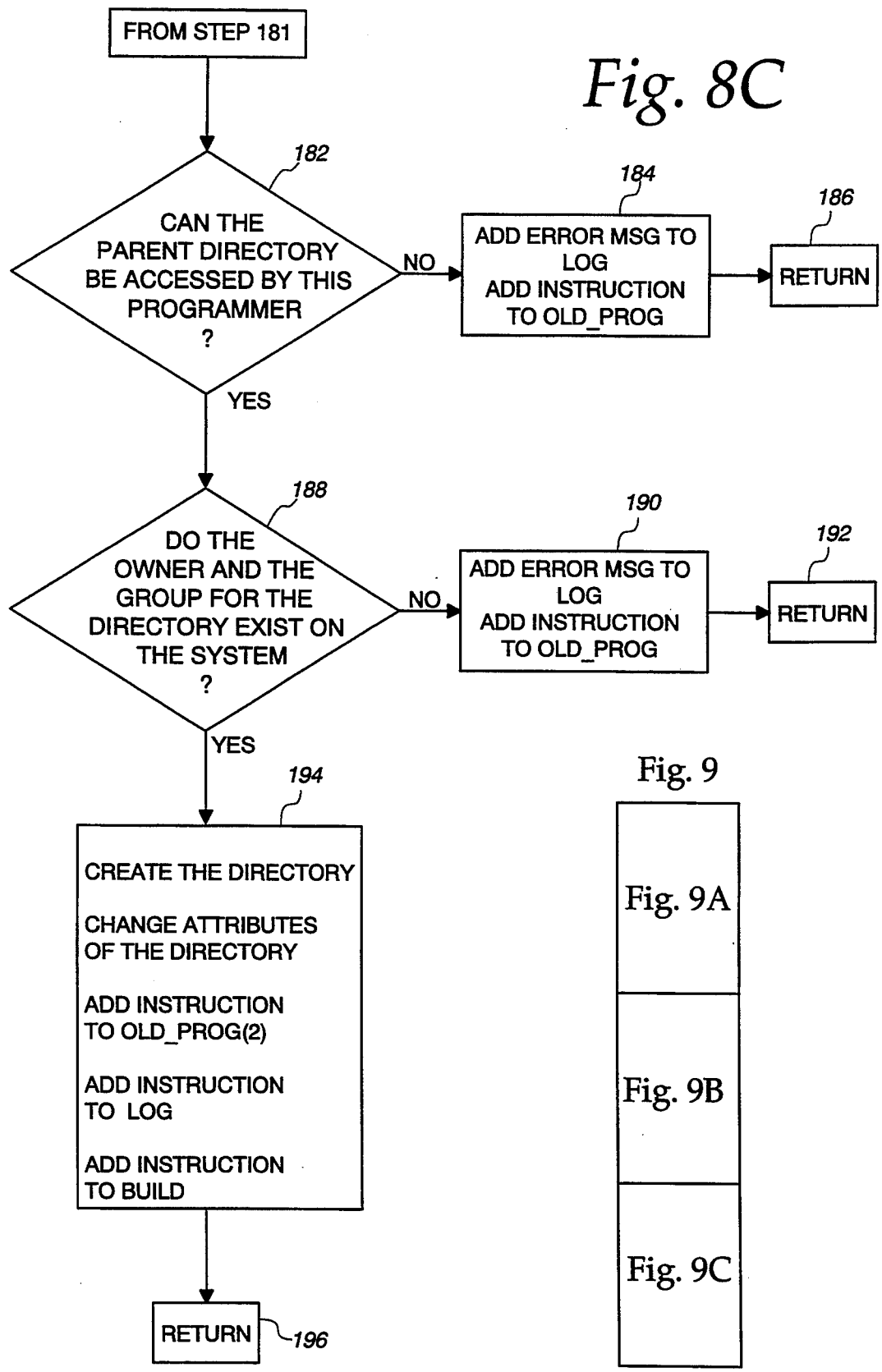

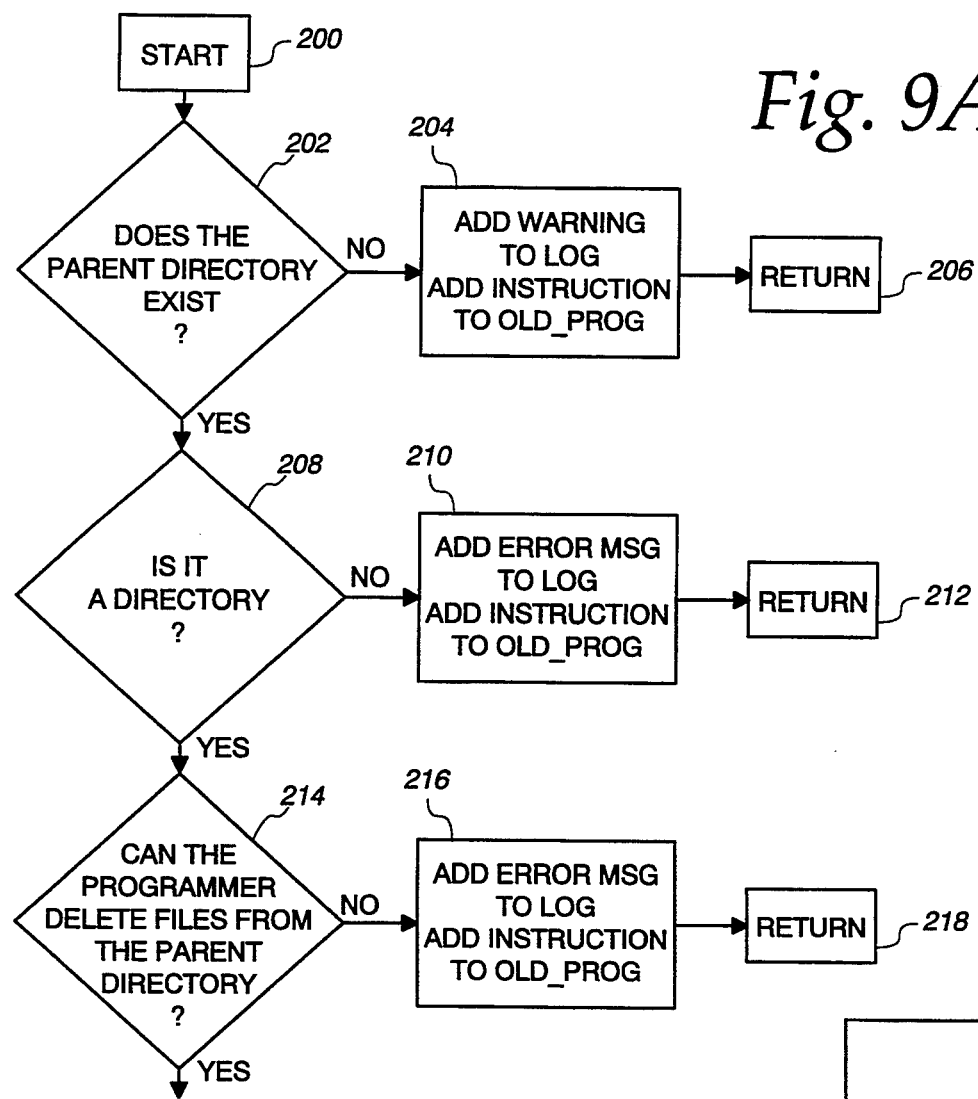
Fig. 9A
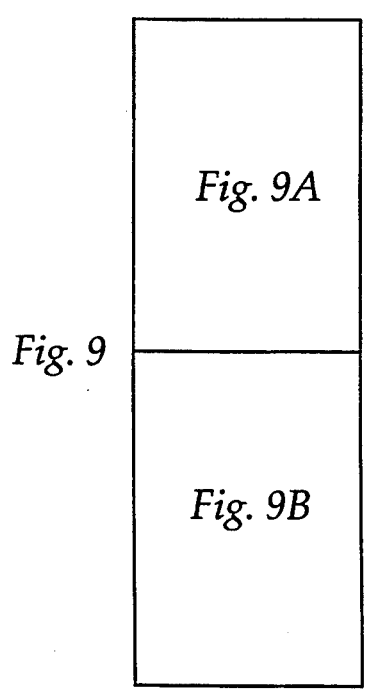

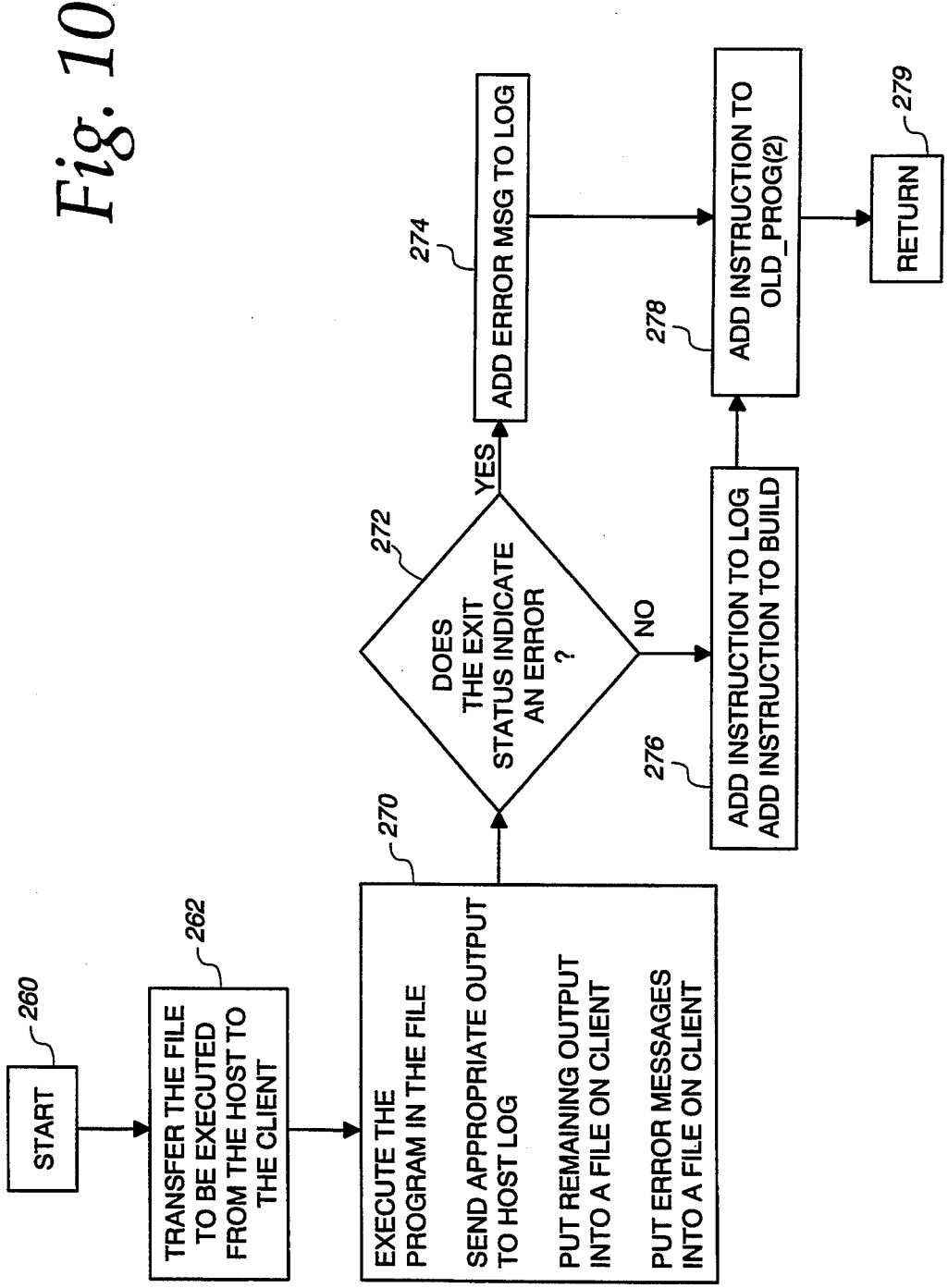

METHOD OF MAINTAINING UPDATED SET-UP CONFIGURATIONS IN WORKGROUPS ON A NETWORK

MICROFICHE APPENDIX

This application includes a microfiche appendix consisting of 5 sheets of microfiche containing 486 frames of a program listing embodying the present invention.

FIELD OF THE INVENTION

The present invention relates to computer software for controlling the operation of individual workstations within a computer network. In particular, the invention relates to a workgroup organized network manager which organizes people into groups and computers into workgroups. As used within this invention, a workgroup represents an organization of people and a group of computers connected together by a network. The host computer controls the workgroup. A user at the host computer creates specifications for controlling the operation of the computers in the workgroup. The present invention acts as an agent for the user and implements the specifications on the clients. The invention implements the specifications either periodically or on command. The workgroup organization limits how individuals may use the invention to manipulate the computers in the workgroup. The invention also limits which computers are controlled.

BACKGROUND OF THE INVENTION

Networks consist of a number of interconnected computers which can include centralized computers connected to remote terminals, a number of individual minicomputers or microcomputers linked to each other, or a combination thereof. In each instance, however, the function of the network is to provide a means for communicating information throughout the network. The minicomputer or microcomputer based centralized file server or a centralized computer typically includes a large central database of information which is accessed by the users at either remote terminals or computer stations. Economies of scale are achieved in these types of systems by storing the massive amounts of information contained in the central database in one central location.

Computer networks consisting of linked mini-computers or personal computers are not necessarily dedicated to accessing information from a large central database of information. These networks, called distributed systems, instead can be directed to the sharing of information created and maintained at each of the minicomputers or workstations within the network. While the distributed system type of network does not lend itself to the control of large amounts of information, as does the central database type of network, it is usually more flexible in the type and variety of tasks that it can perform. Each individual workstation can communicate with other workstations on the network and files can be shared therebetween. This flexibility, however, also means it is more difficult to control the computers so that they will operate in a similar fashion and produce similar results.

A communication software package or a device driver controls transmission of data or information from one workstation to another over communication lines. In addition to the communication software package, other software packages are available which operate to provide additional features not present in the standard communication software packages.

For instance, a time and schedule management software package allows users to view, track, and schedule time-related activities. Users can manage a personal schedule and other users' schedules as well. Permissions can be granted to allow a user to view or modify the scheduler of another user. In addition, permissions can be tailored to suit each user on a network. Users can be defined as parts of a group, with groupwide clearances assigned to all members of a particular group. In addition, defaults can be set for each group or new user, and when a user is added, the setup for that user will not require modifications. While this type of software package can organize workstations into groups having group wide clearances assigned to all members of a group, the tasks performed by the workstation are limited to the performance of calendar or scheduling type tasks and cannot be used for any other purpose.

Another type of software package for use on a network maintains identical copies of files on multiple computers. The files to be copied, the destination of those files, and the operations performed for updating files are all specified at a source workstation. Whenever files are updated, the file is updated at the source workstation and then sent from the source workstation to the various destination workstations. While this type of software makes updating files a simpler task than previously available, this type of software package cannot control the distribution of information to predefined workgroups nor is there any organizational structure to limit access to particular users. In addition, the destination workstation cannot trigger the source computer to update destination workstation files and therefore cannot be guaranteed the latest versions of the files when they are needed. These packages also do not allow the execution of non-file related commands over the network and do not provide for delayed execution of processes if stations are not available at the time of an update. The stations in the workgroups cannot, therefore, be controlled as a group.

SUMMARY OF THE INVENTION

The present invention is a system of computer programs to organize networked computer workstations into workgroups that are controlled by specifications. The workgroups consist of groups of computers on the network and the people who use the invention to manage them. The computers on the network can include but are not limited to mainframes, minicomputers, servers, and personal computers. For ease of discussion, these machines are referred to as workstations hereinafter. The specifications are the commands that are executed to accomplish the desired results.

Typically, workgroups consist of two or more workstations, in which one workstation is designated to be a host workstation and the remaining workstations are designated to be client workstations. A workgroup is not limited to any maximum number of workstations and a workstation may be part of many workgroups. Workgroups also consist of groups of people, with varying responsibilities, that operate the workgroup. The responsibilities may be distributed between several different people or may be allocated to one person. The host workstation provides the means for setting up the workgroup and for defining the responsibilities of the people who operate the workgroup. The specifications are also developed on the host and are implemented by installing them in the host workgroup library. As part of the workgroup setup, the workstations which may become clients are defined and then may be addressed by the specifications. A client station administrator defines workstations to be a client by entering the host station name into a client copy of the invention which resides in the client workstation. The client station administrator thus prevents the invention from making changes on the client, if specified. Either a host station or a client station can initiate the execution of the specification on a client since the client and host station are linked together through the software.

The people who operate the invention are designated as station administrators (both host and client), workgroup leaders, workgroup programmers and client users. The administrators install and maintain the invention, define rules of operation and set up the workgroups. The workgroup leaders designate the workgroup programmers and define the limits they operate under. The workgroup programmers write the specifications which actually control the workstations. The client users (engineers, accountants, draftspersons, etc. who actually use the stations) use the files and environment provided through the invention.

Specifications define how a programmer manages client workstations. The invention implements the specifications automatically on all of the client workstations having defined specifications. The effort required to manage a workgroup is reduced to planning and writing specifications instead of repeating similar tedious defining actions on each client workstation. In addition, the invention provides log files showing the history of each workgroup and audit trails showing all implemented specification statements.

Each individual client workstation within a workgroup operates according to a specification defined by a program or programs on the host workstation. The specification defines the parameters within which the workstations and workgroups operate. Because workstations are controlled by the specification, individual workstations can be automatically configured for individual tasks.

Specifications are programs containing specification statements that have been entered into a workgroup library. Programs may be written separately or may be modified at a later time. The client only executes specification statements it has not executed before. The statements are active as long as they remain in the library.

Specification statements typically are equivalent to several commands in the native operating system. The invention checks to see that all of the native commands can be completed successfully before executing the specification statement. This prevents the clients from being left in an intermediate state because some of the native commands did not succeed.

Some specifications may pend. Pending specifications are specifications that will not execute until some condition or conditions are satisfied on the client. When the conditions are satisfied, then the specification statements are executed.

Active specifications (those entered into the workgroup library) may be referenced at any time. If a new workstation is added to the workgroup, the specification can be referenced immediately and the workstation set to the same configuration as the other stations in the workgroup. If a client station is disconnected when the host requests that the clients implement the specification, then the station will not be in the correct configuration. Since the invention on the client station recognizes which computer is the host within its workgroup (and thus the location of the workgroup library), the invention on the client can implement the specification when the client rejoins the network.

Before a client station implements the workgroup's specification contained in the library, the invention on the client must retrieve a copy of the workgroup library. The invention uses a single computer account, that exists on all stations, for sending files and other computer network communication. A workgroup's specification can have several programmers. When the invention executes each specification command on a client, the command is executed as if by the command's programmer. It is similar to the programmer logging on to the client and then executing the command. The invention does not use the programmer's computer account or password, thereby enabling the programmer, on the host computer, to control and modify the clients in his workgroup simply by placing specification commands in the workgroup library. The invention tightly controls access to workgroup libraries. Only clients who are members of the workgroup can access the workgroup's library and only clients can access it through the invention.

BRIEF DESCRIPTION OF THE DRAWINGS

FIGS. 7A–7C is a flow diagram of a copy_ref function module.

FIGS. 8A–8C is a flow diagram of a directory function module.

FIGS. 9A–9B is a flow diagram of a remove function module.

FIG. 10 is a flow diagram of an execute program module.

DETAILED DESCRIPTION OF THE PREFERRED EMBODIMENTS

Figure 1:
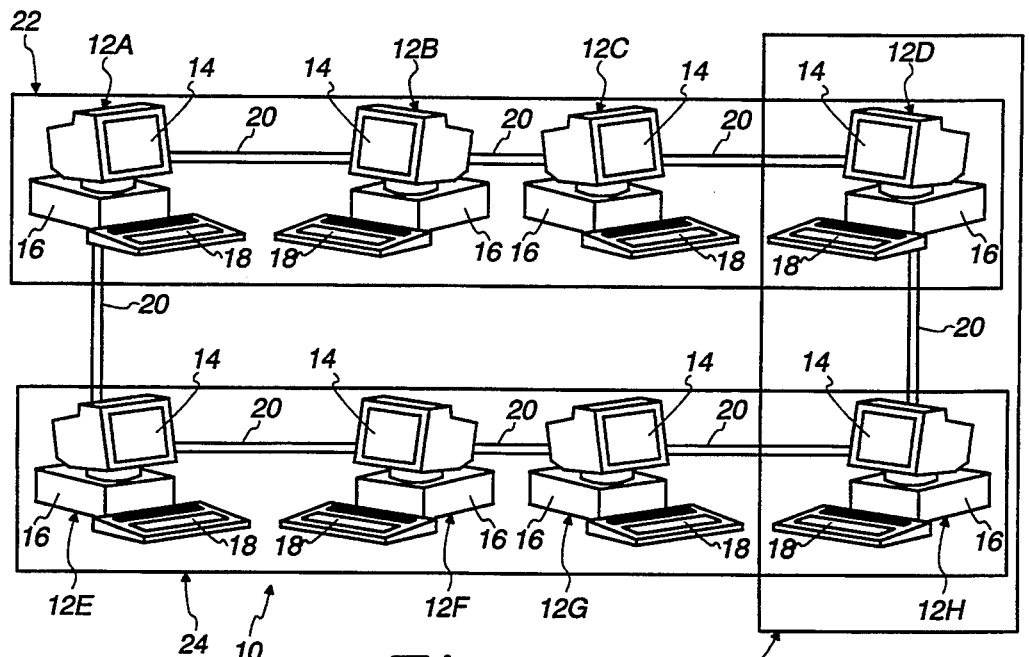
FIG. 1 is a schematic diagram of a networked computer system organized into workgroups.

FIG. 1 illustrates a networked computer system 10 containing a plurality of workstations 12. Each workstation 12 is further identified by a letter, A through H, to aid in the later discussion. Each workstation comprises a video display terminal 14, a computer 16 and a keyboard 18. Each workstation 12 communicates to other workstations 12 via the network as is understood by those skilled in the art.

The present invention is a system of computer programs that organizes and manages workstations 12 within the network 10. While the present invention is written in the C language and UNIX scripting languages and is directed to be used on a UNIX operating system, the present invention is not limited to UNIX and other embodiments will become apparent to those skilled in the art. The present invention controls as many workstations as are contained within the network and is not limited to the number illustrated here.

The workstations 12 of the network 10 are organized into workgroups consisting of workstations selected to be within the organized workgroup by an administrator. For instance, as illustrated in FIG. 1, the network 10 is divided into a first workgroup 22 consisting of workstations 12A through 12D, a second workgroup 24 consisting of workstations 12E through 12H, and a third workgroup 26 consisting of workstations 12D and 12H.

Workgroups correspond most directly to the organization of workgroups in a business, manufacturing, or design environment or other organization such as sections, departments, and projects. For instance, in a manufacturing facility, the workgroup 22 might consist of the electrical engineering department, the workgroup 24 might consist of the mechanical engineering department, and the workgroup 26 might consist of one electrical engineer and one mechanical engineer chosen to work on a specific project.

The workgroups and the individual workstations comprising the workgroups are selected by the administrator according to the individual requirements of each workgroup. As each workgroup is dedicated to the production of a certain type of work product in the case of an engineering design firm, the invention manages each workstation within the workgroup according to specifications that can be defined within the invention. Of course, the present invention has many other applications, for instance, delivering software to various departments within a business organization, analyzing computers in a network, and determining disk space on the workstations.

Before the present invention is operational, the system of programs comprising the invention must be installed on every workstation in the network 10 and certain variables must be defined to give structure to the network according to the individual requirements of the workgroups and workstations.

Once the invention is installed, workgroups can be defined. The definition of a workgroup includes designating one of the workstations 12 to be a workgroup host, designating a number of individual workstations to be workgroup clients, and designating a group of people having defined responsibilities that use the invention to manage the workstations. This and other information is put into a number of files on the workgroup host.

Figure 2:
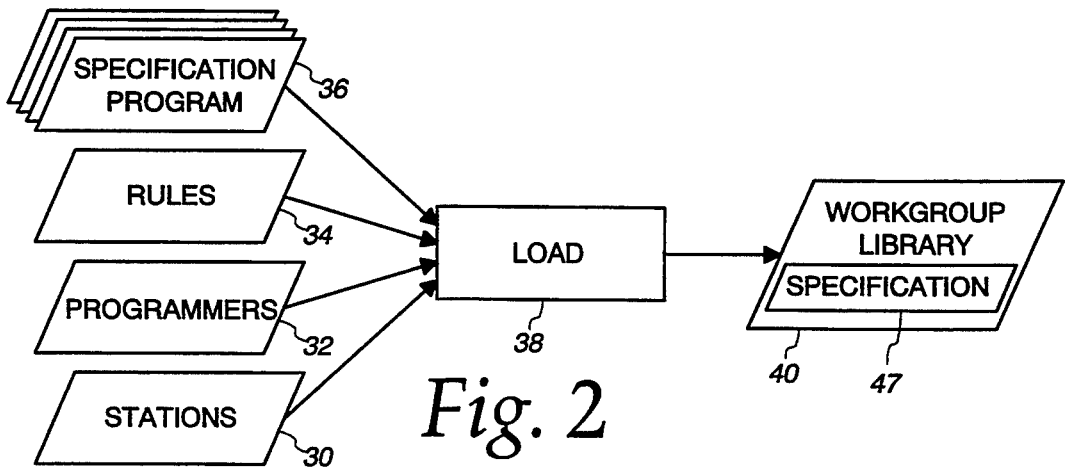
FIG. 2 is a block diagram illustrating the creation of a library file by a load program with a plurality of files as input.

FIG. 2 illustrates a block diagram of certain files on the workgroup host which are created to run the present invention. The files which are created are the stations file 30, the programmers file 32, the rules file 34 and the specification program file 36. These files are input to a load program 38, which checks and adds the specification program file to the workgroup library file 40. Each workgroup has one each of the stations file 30, the programmers file 32, and the rules file 34, but can have many specification program files 36. The stations file 30 contains a list of labels that specify combinations of workstations used by the workgroup. For instance, each label for workgroup 22 as shown in FIG. 1, would be limited to stations 12A, 12B, 12C, and 12D. Each label is saved in the stations file 30. Once the stations have been defined and stored in the stations file 30, the programmers given authority to create the specification programs are defined.

Programmers are individuals who are given the authority to act as a programmer within a defined workgroup. Once each of the programmers has been chosen, each programmer is defined to have the capability of performing certain specification commands on assigned workstations. This information is saved in programmers file 32. The specification commands the programmer may be allowed to use include a copy command, a directory command, a remove file command, a remove all command, a refresh command, an execute command and a remove directory command. Each of these commands typically is equivalent to several commands in the UNIX operating system. The details of these commands will be described later. In addition to the station file and the programmer file, the rules file needs to be defined.

The rules file 34 is established by the workgroup leader and the system administrator. The rules file 34 contains rules used by the load program 38 to check specification programs written by the programmer before adding the specification programs to the workgroup library 40. The rules provided with the invention maintain various levels of security in addition to that provided by UNIX. A mechanism is also provided to allow the host administrator to add to or modify the rules to meet security or other requirements.

A specification program file 36 is a file which is created by a programmer previously defined in the programmers file 32. The workgroup programmers develop specification programs using the specification programming language provided by the present invention. In addition, the invention contains a create_prgm 46, shown in FIG. 3, that can automatically generate specification commands for files in a list, thereby relieving the programmer of much effort when creating new programs. The create_prgm 46 provides a choice of refresh or copy instructions to move files. The generate program will be discussed later.

The specification program file 36 contains individual specification commands written by the programmer to manage the client computers in a workgroup. The load program 38 checks these commands according to the rules file 34. When the programmer loads a specification program, the program is written into the workgroup library 40. Loading the specification program makes the commands within the program active. The present invention implements the specifications 47 contained in the workgroup library 40 on the client computers or stations. Once loaded, the specification program is active and may be referenced by the invention on any workgroup client as long as it remains in the workgroup library 40. How clients implement the specification in the workgroup library 40, will be discussed later. The present invention includes eight specification commands with various options. These instructions are shown in the following Table 1. The instructions are copy, refresh, direct, rm_file, rm_dir, rm_dir, rm_all, execute and #.

TABLE 1 copy [-m] -h host_file -c client_file -o owner -g group
-p protection -s labels -d date
refresh [-m] -h host_file -c client_file -o owner -g group
-p protection -s labels -d date
dir -c client_directory -o owner -g group -p protection
-s labels -d date
execute -h host_file -1 shell -s labels -d date TABLE 1-continued

```
rm_file -c client_file -s labels -d date
rm_dir -c client_directory -s labels -d date
rm_all -c client_directory -s labels -d date
# comment
```

As seen in Table 1, each of the commands begins with the name of the command and is followed by a list of parameters assigned by a workgroup programmer. The copy command starts with the word "copy" and is followed by -h host_file, which specifies a certain file contained on the host, -c client_file, specifying the name given to the file on the client, -o, the owner of the file, -g, the group in which the file will be contained, -p, the protection of the file, -s, the labels, and -d, the date that the command was created. The copy command copies a file from the host to the clients. In addition, the copy command can also change the mode, the owner, and the group of the file, if the programmer has the privileges required by the client computer. Copy also has a maintain option -m, which means that if the file changes on the host, the new file will be transmitted to the clients. This feature will be described in more detail later. The copy command is similar to the sequence of UNIX instructions cp, chmod, chown, and chgrp. The copy command is not executed until all UNIX instructions necessary to implement the copy command can all be performed. This prevents the copy command from being partially executed on a client. This is a trait of all specification commands.

As seen in Table 1, the refresh command has the parameters previously cited for the copy command. The refresh command copies a file from the host to the clients. The refresh command is different from the copy command in that the present invention will not execute the refresh command unless a copy of the file already exists on the client. Such a feature is useful when the programmer does not know which computers or stations have a copy of the file. For instance, the programmer can create a refresh command that updates shell scripts or design references files on all computers in a workgroup. Only those computers with the file will be updated. This is different than the copy command, which will only execute if the file's parent directory exists on the client.

The directory command creates directories on the client. The mode, owner and group are specified. The directory command is not executed unless the directory's parent exists on the client. If the parent directory doesn't exist, the present invention waits for it to appear and then executes the directory command.

The execute command runs UNIX programs on the clients. The execute command has several features that simplify running UNIX programs on many stations on the network. Output from the executed UNIX program can be put into a host log of the present invention. Messages can be mailed to the owner of the individual programs. The present invention places the standard output and standard error in a temporary file on the client.

The rm_file command removes a file from the individual client and it is quite similar to the rm command in UNIX. If the file is not present on the client or if the command would fail, the present invention ignores the command and does not attempt to execute it later.

The rm_dir command removes the directory from the client and is similar to the rmdir command in UNIX. Like UNIX, the directory must be empty for the command to succeed. If the directory is not present on the client or if the command would fail, the present invention ignores the command and does not attempt to execute it later.

The rm_all command removes a directory and its files and subdirectories from the clients. The rm_all command is different from the UNIX "rm—r" command in that it first checks to see if all files and directories can be removed before beginning. The rm_all command works only if it can successfully remove all the directories and files as instructed. If the command cannot succeed on the client, the present invention ignores the command and does not attempt to execute it later.

Finally, the last command is the # command which allows one line of comment to be inserted into the program.

The meaning of the available options for each of the prior instructions is listed in the following Table 2 and is shown as previously discussed.

TABLE 2

-m  This maintain option means that if host_file changes
    on the host, the command will re-execute on the
    client.
-h  host_file
    Use host_files as the source host file for the command.
-c  client_directory or client_file
    Use client_file (client_directory) as the target client file
    (directory) for the command.
-o  owner
    Make owner the owner of the target directory or
    file (client_directory or client_file) on the client.
-g  group
    Make the target directory or file (client_directory or
    client_file) belong to the UNIX group on the client.
-p  protection
    Set the protection of the target directory or file
    (client_directory or client_file) to protection where
    protection is of the form "rwxrwxrwx". These three sets
    of letters represent read, write, and execute
    permissions for the UNIX owner, UNIX group, and
    others.
-s  labels
    Labels specify combinations of stations used by the
    workgroup. The present invention executes the
    command on the stations represented by labels.
    Labels can be several labels separated by commas.
-d  date
    The date and the time the command line was written or
    last modified. Date uses the following format:
    mm/dd/yy-hh:mm:ss
-l  shell
    Use shell when executing host_file on the client. Shell
    can be any common UNIX shell - sh, ksh, csh.

Once the stations file 30, the programmers file 32, the rules file 34 and the program file 36 have been completed, the programmer uses the load program 38 to place the specification program and the stations file 30 into the workgroup library 40. The workgroup library 40 contains individual instructions defined by the programs, which include not only those instructions which have been defined by the programmers, but also include additional information generated by the load program 38.

To illustrate the operation of the load program 38, an example using the copy instruction will be discussed. The copy instruction used as an example is shown in Table 3.

TABLE 3

```
copy -m -h /usr/ron/build -c /usr2/ron/build2 -o
ron -g proj_100 -s elect -d 05/28/92-17:10:09
```

As seen there, -m is included, which means that if the host file changes, the changed file will be automatically copied to the client station. The host file -h, which is identified here as /usr/ron/build, is the source host file for the command. The client file -c, which is identified here as -c /usr2/ron/build2, is the target of the copy command. The owner -o is identified here as ron. The group -g is identified as proj_100, which makes the target file belong to the proj_100 UNIX group on the client. The label -s, which is identified here as elect, represents stations in the electrical group previously shown as workgroup 22 in FIG. 1. Finally, -d indicates the date and time that the command was written or last modified. The load program 38 first checks the syntax of the copy command and then identifies the protection, owner, and group for the file usr/ron/build and the directory /usr/ron. It also gets the date when the build file was last modified. This information comes from the operating system and is used to perform certain checks. The present invention will not load the command into the library file 40 if any of the checks fail.

The load program 38 uses the rules file 34 to check the specification program. It uses the stations file 30 to make certain that elect is a valid label. The load program 38 uses the programmers file 32 to see whether or not ron can use the copy command and whether or not ron can use the elect label. In addition, the load program checks to see whether or not ron can access the file build and, in addition, the file build is checked to make certain that it is an ordinary file and can be read by others. Of course, other checks can also be implemented into the load program at the option of the individual person using the present invention. The present embodiment determines whether a condition is satisfied by using standard conditional test statements known to those skilled in the art. After passing these tests, the present invention calculates the check sum for the build file and assigns values to the following copy parameters shown in Table 4:

TABLE 4

-U ron -G proj_100 -K check_sum -P /usr/ron/prg.mp
-M modify_date

The load program assigns these values to the copy parameters if all the tests have been passed. As seen in Table 4, -U ron indicates that ron is the UNIX user who loaded the program into the workgroup library. -G proj_100 indicates the UNIX group that the programmer belonged to when the program was loaded into the library. -K check_sum indicates the value of the check sum for the particular file indicated. -P /usr/ron/prg.mp indicates the name of the program file and its directory. -M modify_date indicates the date that the file was last modified. In addition, certain other optional checks can be performed by the present invention. These checks establish additional levels of security. For instance, one check that could be performed is to determine whether or not the file build is owned by ron. Also, does the file build belong to the proj_100 UNIX group, and is the directory /usr/ron owned by the programmer ron. If these checks are implemented, then these additional checks limit access. Of course, these are not the only optional checks that can be included and additional checks can be made as is understood by those skilled in the art according to the teachings presented herein.

Once the load program 38 has determined that the copy command passes each of these checks, then the present invention creates a new copy instruction which the load program 38 writes to the PROJ workgroup library.

The copy command is contained in the library 40 as shown in Table 5:

TABLE 5 copy -P /usr/ron/prg -m -h /usr/ron/build
-c /usr/ron/build2.mp -o ron -g proj_100 -s elect -d
05/28/92-17:10:09 -U ron -G.proj_100 -K
check_sum -M modify_date This copy command includes the particular parameters which have been generated by the load program based on the rules and based on the information previously programmed into each of the files.

Table 6 illustrates a basic configuration of the library 40:

TABLE 6

```
#!<LIBRARY>
#!STATION HEADER -d last_modify_date
    STATION DATA
#!STATION FOOTER
#!PROGRAM HEADER -P program -d date_loaded -U USER
    -G GRP
    PROGRAM COMMANDS
#!PROGRAM FOOTER -P program
  .
  .
  .
#!PROGRAM HEADER -P program -d date_loaded -U USER
    -G GRP
    PROGRAM COMMANDS
#!PROGRAM FOOTER -P program
```

As shown, the library is labeled in the beginning as a library. Following that, there is an indication of a station header and a station footer, which contains the definition of labels that can be used by the -s option of program commands. Following that is a program header including certain parameters which are defined in Table 7:

TABLE 7

-d last_modify_date
    The date when the STATION DATA was last
    modified by the workgroup leader.
-d date_loaded
    The date when program was loaded into the
    library.
-P program
    The name of the program file and its directory.
-U USER
    The name of the programmer that loaded the
    program into the library.
-G GRP
    The UNIX group that the programmer belonged to
    when the program was loaded into the library.

Following the program header are individual program commands. It is here that the individual program commands are listed as generated by the load program 38. For instance, the program command copy, shown in Table 5, would be contained within this section of the program commands. PROGRAM COMMANDS contains any number of specification commands previously written by the programmer which have passed all the tests which the load program 38 performed.

Following the program commands is a program footer delineating the end of the program. The library may contain additional specification programs each consisting of program headers, followed by specification commands and program footers.

Eight types of commands used in the present invention are contained within the program sections of the library. These commands are the same as those previously used by the programmer to generate the individual programs for each of the files. Table 8 lists these commands, which have been modified by the load program 38 to include additional information not previously shown when the programmer programmed the individual commands in the first place.

TABLE 8

```
copy -P program [-m] -h host_file -c client_file -o owner
    -g group -p protection -s labels -d date -M modify_date
    -K check_sum -U USER -G GROUP
refresh -P program [-m] -h host_file -c client_file -o owner
    -g group -p protection -s labels -d date -M modify_date
    -K check_sum -U USER -G GROUP
dir -P program -c client_directory -o owner -g group
    -p protection -s labels -d date -U USER -G GROUP
execute -P program -h host_file -l shell -s labels -d date
    -M modify_date -K check_sum -U USER -G GROUP
rm_file -P program -c client_file -s labels -d date
    -U USER -G GROUP
rm_dir -P program -c client_directory -s labels -d date
    -U USER -G GROUP
rm_all -P program -c client_directory -s labels -d date
    -U USER -G GROUP
# comment
```

Table 2 lists the meanings of the arguments for most of the above commands, while Table 9 lists the same information for the -P program, -U user, and -G group arguments:

TABLE 9

```
-P program
    The name of the program file and its directory.
-U USER
    The name of the programmer that loaded the program
    into the library.
-G GROUP
    The UNIX group that the programmer belong to when
    the program was loaded into the library.
```

Figure 3:
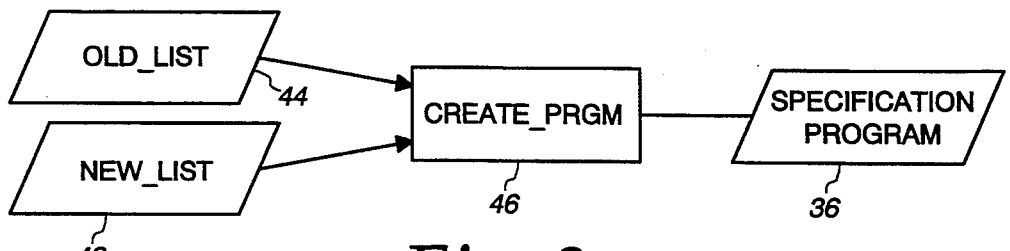
FIG. 3 is a block diagram illustrating the creation of a program file by a program called create_prgm.

FIG. 3 illustrates an additional feature of the present invention in which the program file 36 is automatically created by create_prgm program 46. The create_prgm 46 creates a specification program based on the data in new _list 42 and old_list 44.

Table 10 shows the create program instruction which is generated by the programmer. The programmer inserts the information necessary into the appropriate locations shown in the create program instruction of Table 10.

```
create_prgm -c {copy | refresh} [-m] -s labels
    [-o old_list] -d source_dir -t target_dir
    -i new_list
```

The create_prgm 46 will create a copy or refresh command for the files in the new_list, depending on whether the copy or refresh command has been selected. The create_prgm 46 will also create dir commands for the files' parent directories if the copy command is used. If the -o option is used, in which the old_list is shown, then the program will also contain remove commands. It will have a rm_file command for each file listed in the old_list that is not also listed in the new_list. Similarly, it will have a rm_dir command for each directory in the old_list that is not also in the new_list. The various options are defined and shown in Table 11 for the create_prgm 46.

TABLE 11

```
-i new_list
    File new_list contains a list of directories and
    files used to create the program. Each record in
    new_list can only have one directory or file.
-c {copy | refresh}
    Use the copy or refresh command.
-m  Use the maintain option in the copy or refresh
    commands.
-s labels
    Use labels in each command to specify which
    computers should execute the commands on. Labels
    can be several labels separated by commas.
-d source_dir
-t target_dir
    If the source directory (source_dir) and target
    directory (target_dir) differ, the copy and refresh
    commands will send the files and create
    directories from the source directory on the host
    to the target directory on the clients.
-o old_list
    File old_list contains a list of directories and
    files. The present invention will generate rm_dir
    and rm_file commands for all directories and files
    listed in old_list but are not in new_list. Each
    record in old_list can only have one directory or
    file.
```

First, the create_prgm checks for mandatory options which are the -c, -d, -t, -s and -i options. If the -o is used, the create_prgm finds the directory and file entries in the old_list that are not in the new list. The selected entries are sorted in reverse order to process file entries before directory entries. Then, for each entry, the create_prgm generates an rm_file command if it is a file, or an rm_dir command if it is a directory. The operating system is used to determine these definitions.

Next, the create_prgm 46 builds a command for each directory and file in the new list. Entries are sorted in the new_list to create dir commands before the copy commands. If the entry is a directory and the -c option is copy, then a dir command is created. The create_prgm 46 includes the directory's owner, UNIX group, and protection in the dir command. This data is obtained from the operating system. The dir command also requires a date, which create_prgm 46 obtains from the operating system.

If the entry is a file and the -c option is copy, then the create_prgm creates a copy command automatically for the new file. This command requires the file's owner, the UNIX group, and protection which is obtained from the operating system. This command also requires a date, which is also obtained from the operating system. If the entry is a file and the -c option is refresh, the create prgm 46 program creates a refresh command. This command requires the file's owner, UNIX group, and protection which create_prgm 46 obtains from the operating system. A date is also required, which is obtained from the operating system.

If source_dir and target_dir differ, then the -c option in each command will have target_dir in place of source_dir.

Each workgroup has its own library. The workgroup library contains a number of specification programs written by workgroup programmers. The programs combine to form a specification for the workstation. This specification defines and limits the operation of each individual workstation within the workgroup.

The present invention in no way limits access to files or information which are on the network and which do not fall within the previously defined parameters of the specification programs. In fact, the present invention is almost transparent to the user in that the user can create and maintain his own files without interference from the present invention.

Figure 4:
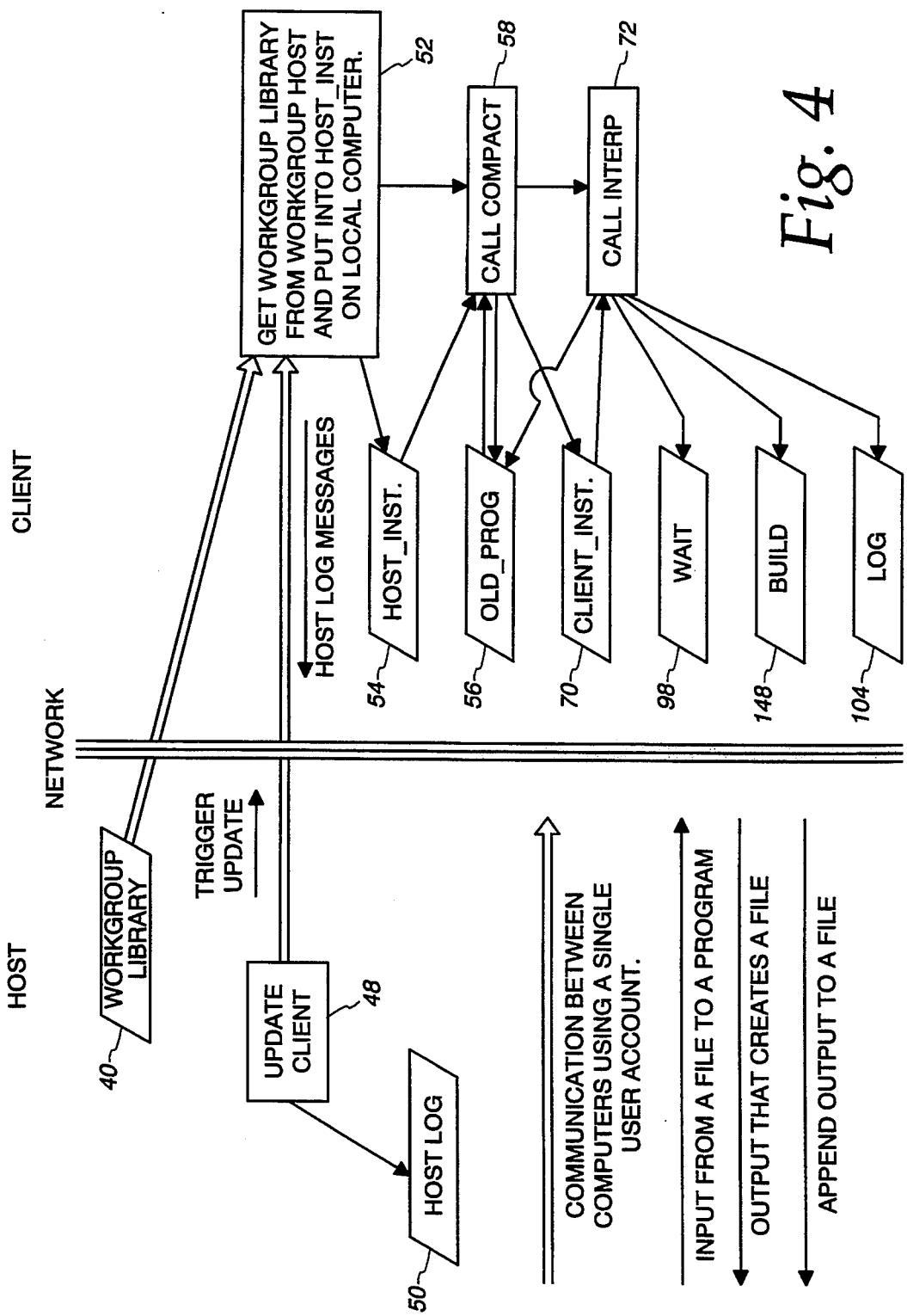
FIG. 4 is a block diagram illustrating a number of program modules and their interaction with and creation of a number of files.

FIG. 4 illustrates a plurality of files and program modules which are used once the workgroup library has been completed. After the load program 38 adds specification programs 36 to the workgroup library 40, the invention on the client can implement the specification programs.

The host update client program 48 establishes contact with a client workstation and executes a first program 52 on the client to implement the workgroup specification 47. Contact between the host and the client is maintained during execution of program 52 so that output from program 52 can be put into the host log 50. The invention uses a single computer account, that exists on all stations, for transferring files and other network communication. If, however, a client workstation initiates the implementation of workgroup specifications for itself, the invention on the client establishes contact with the workgroup host and executes the client update program 48 which, as described above, executes the client program 52 on the client. Client workstations initiate implementations of workgroup specifications through the update client program 48 to maintain the host log 50.

When the workgroup host initiates the implementation of workgroup specifications for client workstations, the invention executes the update utility that updates the workgroup library, described later, and then calls the update client program 48 for each client. The present invention does not call the next client until the current client completes implementation of the specification.

There are various instances when the workgroup client implements the specifications in the workgroup library. Implementation at a client can occur upon power-up of the individual client, at the user's request on the client workstation, at the programmer's request on the workgroup host or at times specified by the workgroup leader on the workgroup host.

Program module 52 gets the workgroup library 40 from the workgroup host and puts the workgroup library 40 into the host_inst file 54, which exists on the client. The host_inst file 54 reflects the current status of the library as contained in the workgroup host.

The client workstation keeps track of specification commands that have been previously implemented on this particular workstation in another file called the old_prog file 56. The old_prog file 56 is both input to and receives output from the compact program 58. Consequently it is convenient to talk of old_prog(1) as the input into compact 58 and old_prog(2) as the output from compact 58.

Figure 5:
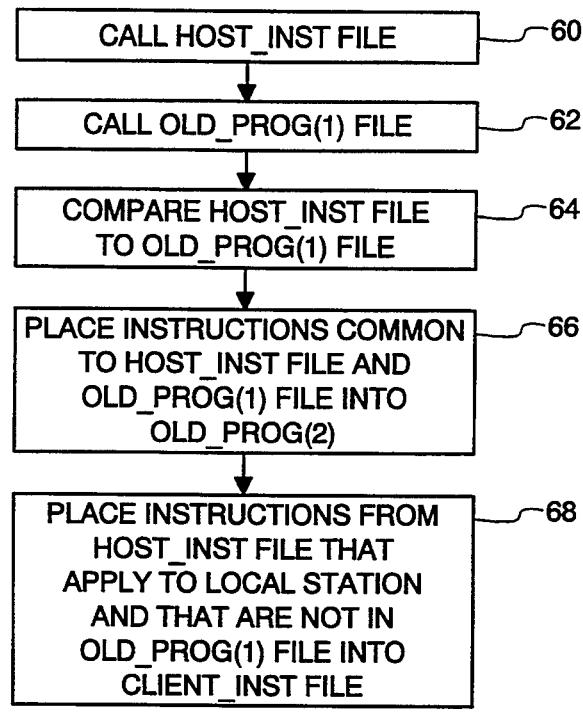
FIG. 5 is a flow diagram of the compact program module.

The updating of the old_prog 56 is performed by a program module called compact program module 58. FIG. 5 illustrates the operation of the compact program module 58. Initially, at step 60, the compact program module 58 calls the host_inst file 54. At step 62, the compact program module 58 calls the old_prog (1). At step 64, the compact program module 58 compares the host_inst file 54 to the old_prog (1) file. At step 66, specification commands which are common to the host_inst file 54 and to the old_prog (1) file, are put into the old_prog (2) file. The common commands are those commands in the workgroup library 40 which have been implemented on the present workstation.

Specification commands in the workgroup library 40 that apply to the client and have not yet been implemented are put into a client_inst file 70. The client_inst file 70 contains instructions from the host_inst file 54 that apply to the local station and that are not in the old_prog (1) file. These include pending commands, described later, and new specification commands. After operation of the compact program module 58, the old_prog (1) file 56 has been replaced with old_prog (2) file 56, and client_inst file 70 contains specification commands that the present invention using a program module called interp 72 executes on the client computer.

Figure 12:
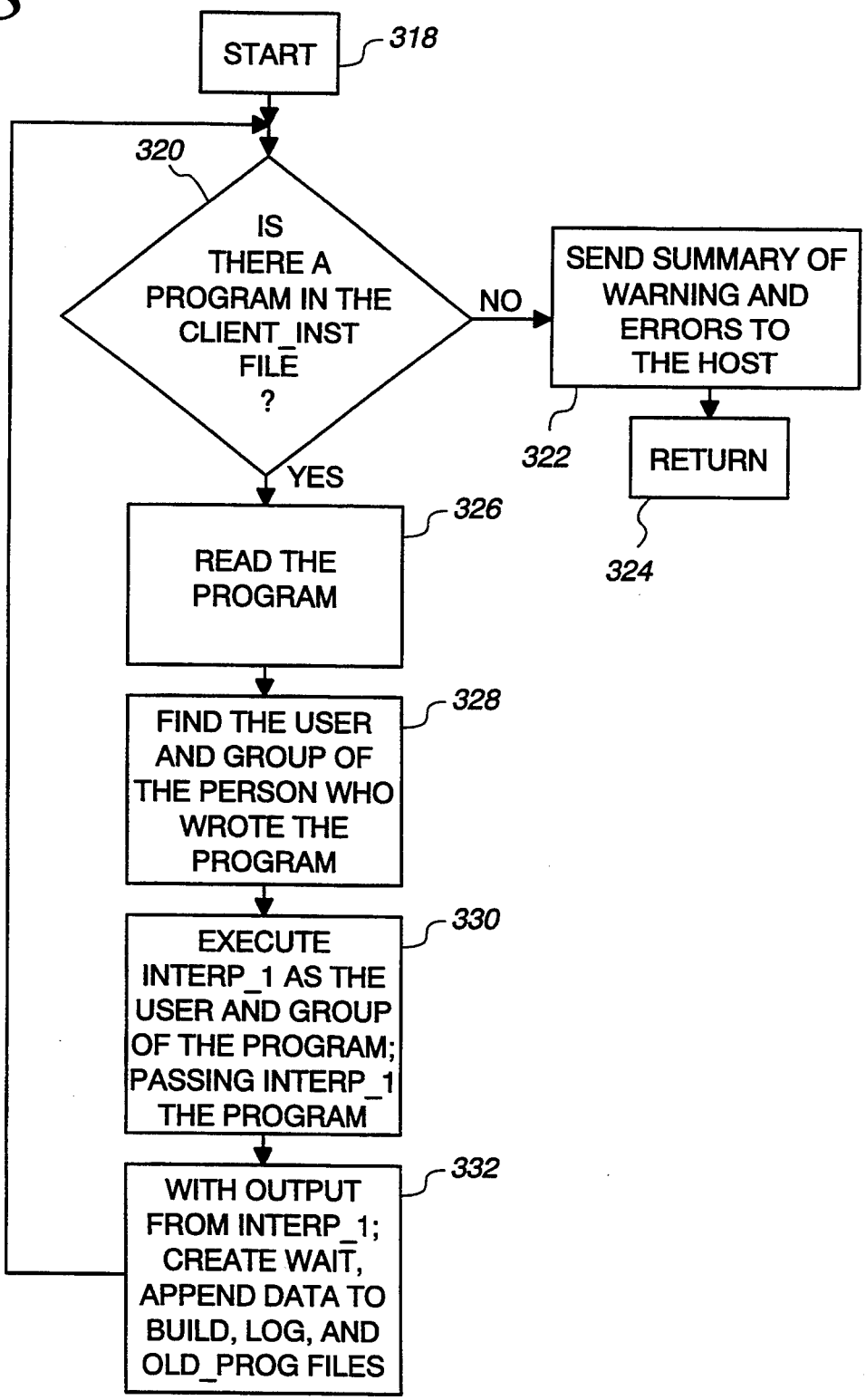
FIG. 12 is a flow diagram of the interp function module.

FIG. 12 describes the operation of the interp program 72. The interp program starts at block 318. Block 320 checks to see if there are any programs in the client_inst file 70. If there are programs in the client_inst file 70, then the next program is read at block 326 and the UNIX user and group of the programmer are determined at block 328. In block 330, the invention executes interp_1 as though it was executed by the programmer of the specification program and passes it the specification program. Output from interp_1 is used to create the wait file 98 that contains pending commands, adds implemented instructions and instructions that cause warnings or errors to the old_prog file 56, adds implemented instruction to the build file 148, and adds warning messages, error messages and implemented instructions to the log 104 in block 332. Following block 332 the programs loops back to block 320. When the client_inst file 70 is empty, then a summary of warnings and errors is sent to the workgroup host by block 322 and the routine exits at block 324.

Figure 6:
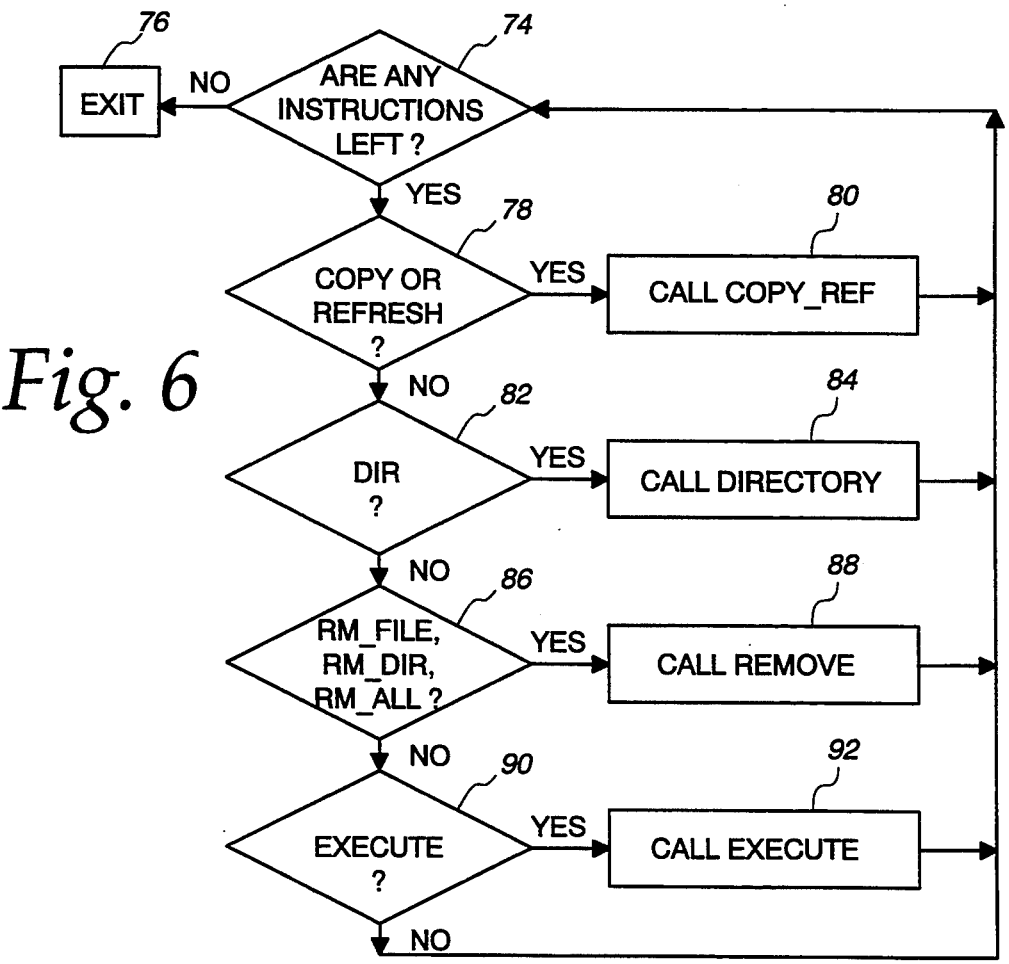
FIG. 6 is a flow diagram of the interp_1 program module.

FIG. 6 illustrates the operation of the interp_1 program. The interp_1 program parses each command and passes arguments to the appropriate function, where execution of the instruction is attempted. Step 74 determines whether there are any more instructions. If no instructions are left from the client_inst 70 file, the interp_1 program exits at step 76.

If client_inst file 70 contains instructions to be executed, each instruction is examined to determine what type of instruction it is. If the instruction is a copy or refresh instruction at step 78, then the copy_ref program is called at step 80. If the instruction is not a copy or refresh instruction, it is checked to determine whether or not it is a dir instruction at step 82. If it is a dir instruction, the directory program is called at step 84. If not a dir instruction, as determined at step 82, then at step 86 it is determined whether or not the instruction is a rm_file, a rm_dir file, or a rm_all instruction. If it is any one of these three instructions, then a remove program is called at step 88. If at step 86 it is determined that it is not a remove type of instruction, then it is determined whether or not it is an execute instruction at step 90. If yes, the execute program is called at step 92. If not, the program returns to determine whether or not there are any instructions left at step 74.

Figure 7A:
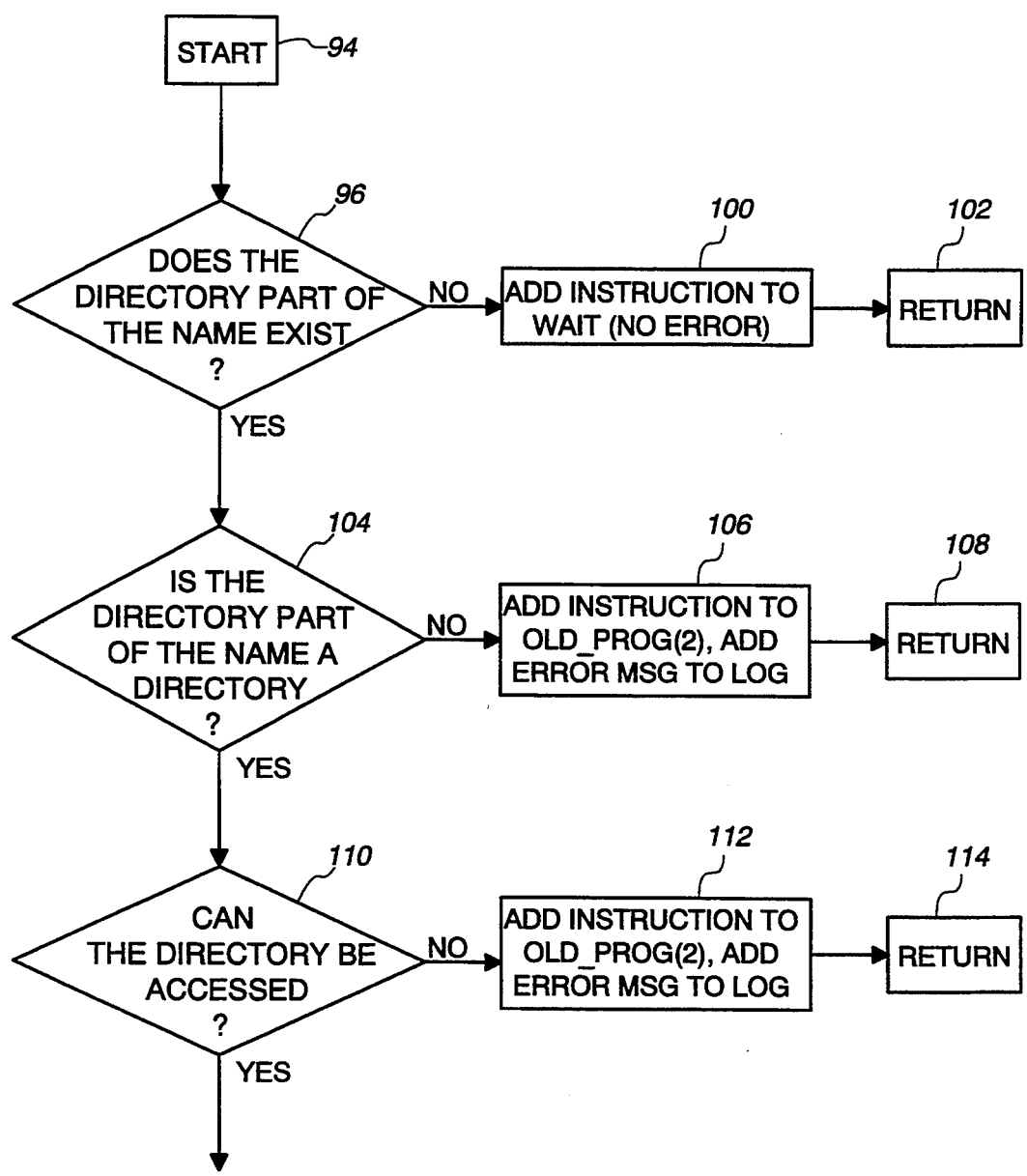
Figure 7B:
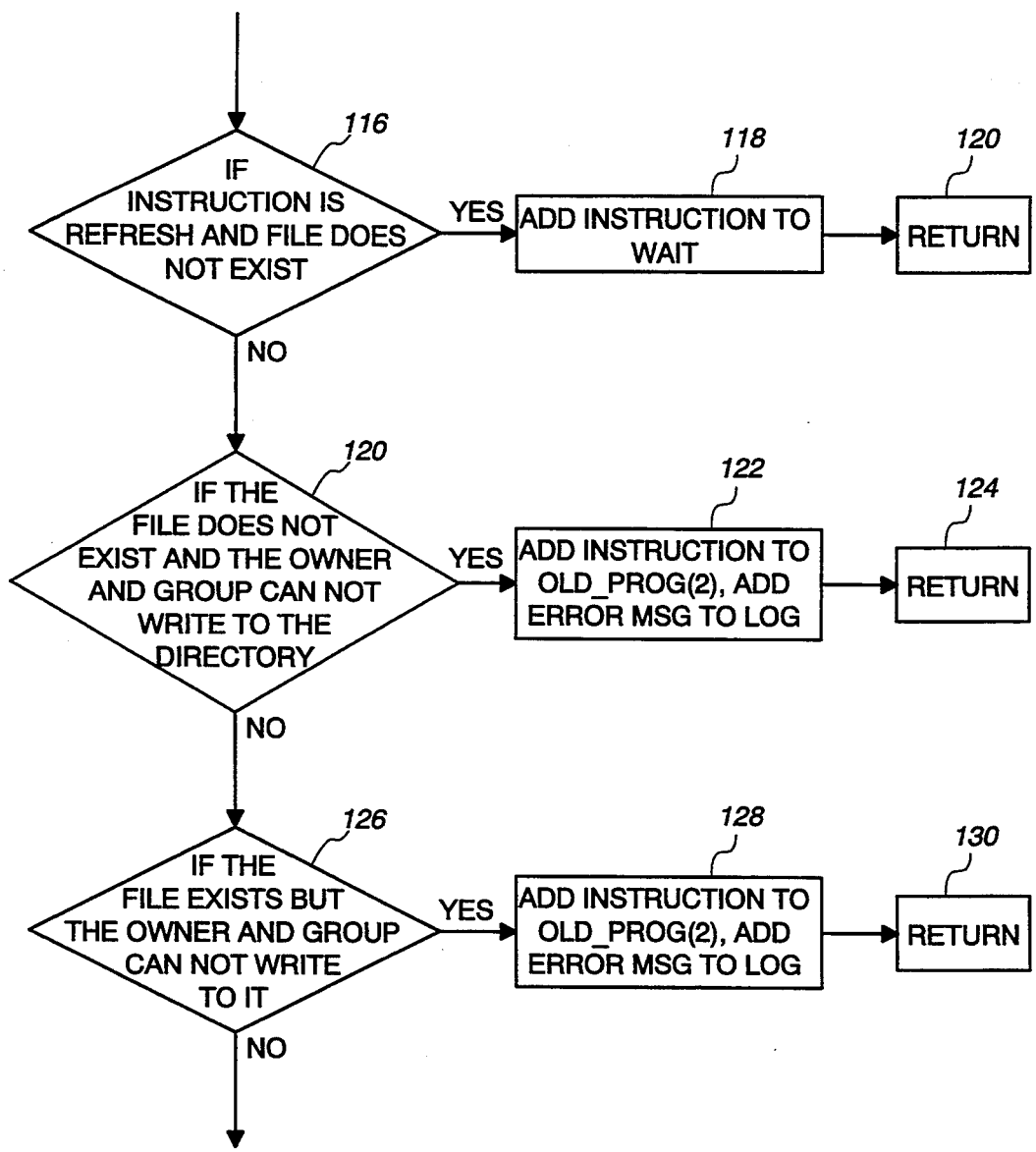

FIGS. 7A-7C illustrate the copy_ref subroutine, which is called at step 80 by the interp_1 subroutine. The copy and the refresh commands copy a file from the host workstation to the client workstation, if the owner and group of the program have permission within UNIX to do so. Both of these commands can also change the attributes of the file on a client if they have the privileges within UNIX to do so. The copy_ref subroutine begins at step 94.

At step 96, it is determined whether the directory that will contain the file exists on the client. If it does not exist, this particular instruction is added to a wait file 98, as seen in FIG. 4. The wait file contains instructions which are waiting to be executed but cannot be executed at this time. They are called pending instructions. Once the instruction is added to the wait file 98, at step 100, the copy_ref subroutine returns at step 102 to the interp_1 subroutine shown in FIG. 6. If, however, the directory part of the name does exist on the client, then at step 104 a determination is made as to whether the directory part of the name is a directory. If not a directory, an instruction is added to the old_prog (2) file 56 and an error message is added to the log file 104 at step 106. Once added, this subroutine returns to the calling subroutine at step 108.

If the directory part of the name is a directory as determined at step 104, the subroutine then determines whether or not the directory can be accessed at step 110. If it cannot be accessed at step 110, then the instruction is added to the old_prog file 56 and is also added as an error message to the log file 104 at step 112. The subroutine then returns to the calling program at step 114.

If the directory can be accessed, as determined at step 110, then the subroutine at step 116 determines if the instruction is a refresh instruction and if the file does not exist. If yes, the refresh instruction is added to the wait file 98 at step 118 and at step 120 the present subroutine returns to the calling subroutine. If step 116 is not satisfied, step 120 checks to see if the file does not exist and that the owner and the group cannot write to the directory. If step 120 is satisfied, this instruction is added to the old_prog file 56 and an error message is added to the log file 104 at step 122. After adding the error message to the log file 104, the subroutine returns at step 124 to the calling subroutine.

If step 120 is not satisfied, then at step 126 if the file exists but the owner and group specified cannot write to that particular file, then the instruction is added to the old_prog file 56 and an error message is added to the log 104 at step 128. Thereafter, the subroutine returns at step 130 to the calling subroutine.

Step 132 follows from a negative decision at step 126. If the file exists and the instruction wants to change the attributes, but the owner and group cannot, then the instruction is added to the old_prog file 56 and an error message is added to the log file 104 at step 134. Upon completion of step 134, the subroutine returns at step 136 to the calling subroutine.

If step 132 is negative, then it is acceptable to copy the file from the host to the client at step 138, at which point the host file is put into a temporary file at the client location. This illustrates the trait that specification commands are not performed until all necessary UNIX operations can be completed. The file is then copied to the to the proper directory and file at step 140. If necessary, attributes are changed at step 142. Once the attributes have been changed, the instruction is added to the old_prog 56 file, the log file 104, and the build file at step 144. When step 144 is completed, the subroutine returns to the calling subroutine at step 146.

As seen by the description of the copy_ref subroutine, the interp routine outputs some commands to a wait file 98. These commands are pending commands. Pending commands are not executed until some condition on the client is satisfied. Pending commands are not put into the old_prog file 56, so the invention will check to see if they can be implemented the next time update client block 48 on FIG. 4 is called. The old_prog file 56 contains all executed commands, whether they succeeded or caused errors or warnings. The wait file 98 can be viewed by users on the client to see what commands are pending. In addition, the log file 104 keeps a record of the result of all executions. This is used for bookkeeping purposes.

In addition to the wait file 98 and the log file 104, a build file 148 is also accessed by the interp subroutine. The build file 148 is maintained on the client workstation only. This build file is an audit trail of all instructions that are successfully executed on the client. The present invention appends the implemented commands from each workgroup to the same build file.

Specification programs are normally left in the library. The present invention keeps track of the commands that have been attempted and does not re-execute those that were successful or those that caused an error or a warning. As long as the specification remains in the workgroup library, the invention can implement the specification on any new workstations that may be added to the workgroup and on workstations that may have been off-line. In addition, the specification must remain in the library for pending commands to be implemented.

The copy and the refresh command may not execute and may not cause an error. These pending commands will be attempted again as long as they are left in the library.

Pending commands allow the programmer to write specifications that respond to differences between clients and to changes on a client. This is often needed when setting up projects or distributing software to the individual workstations. For example, if a programmer wants to configure some software, he can write a specification without knowing which computers in a group have or will have the software.

Returning now to FIG. 6, if the interp_1 routine determines at step 78 that the instruction is not a copy or refresh command, it proceeds to step 82 where it determines whether or not the command is a dir command. If it is a dir command, at step 84 the directory subroutine is called.

Figure 8A:
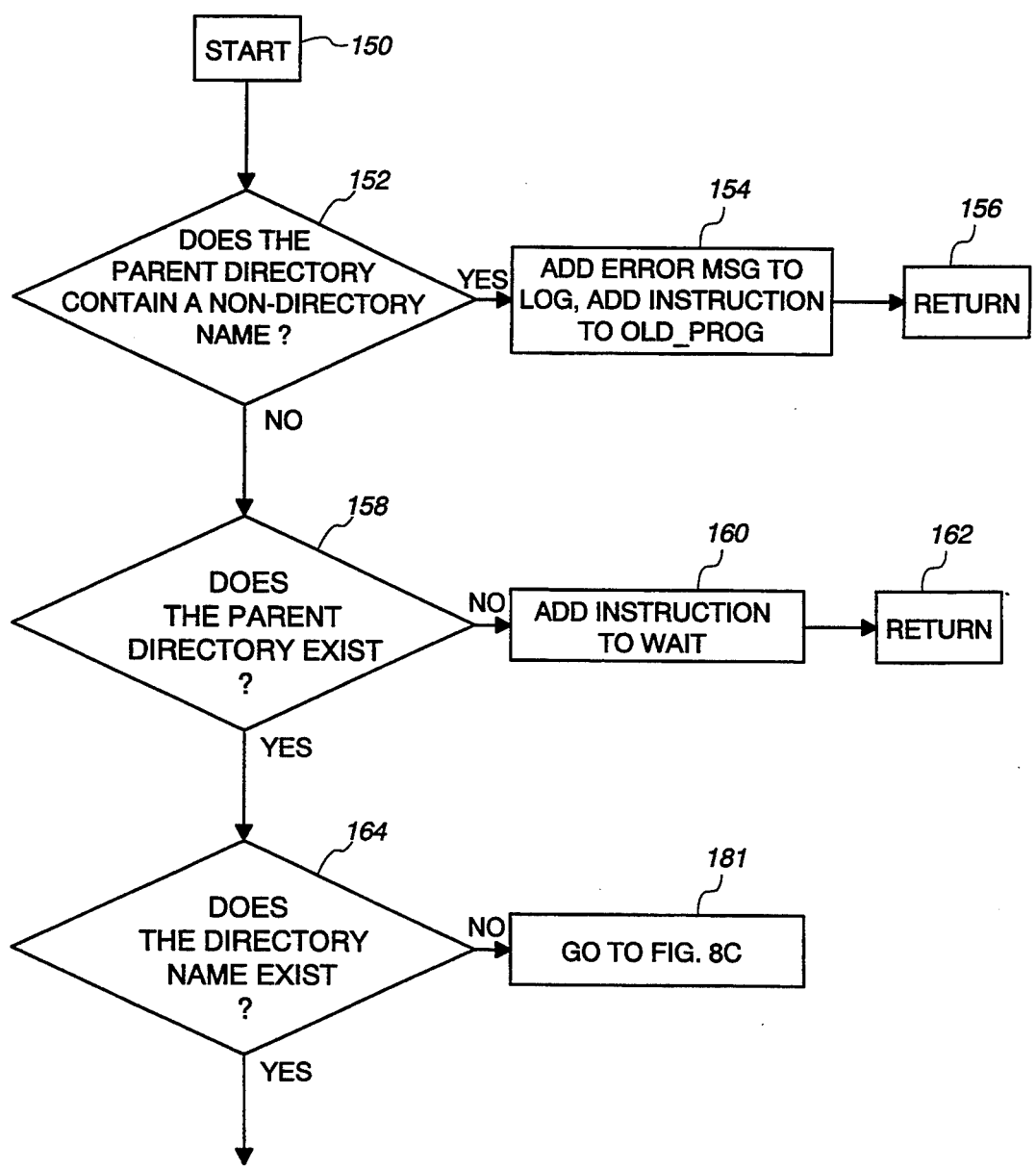
Figure 8B:
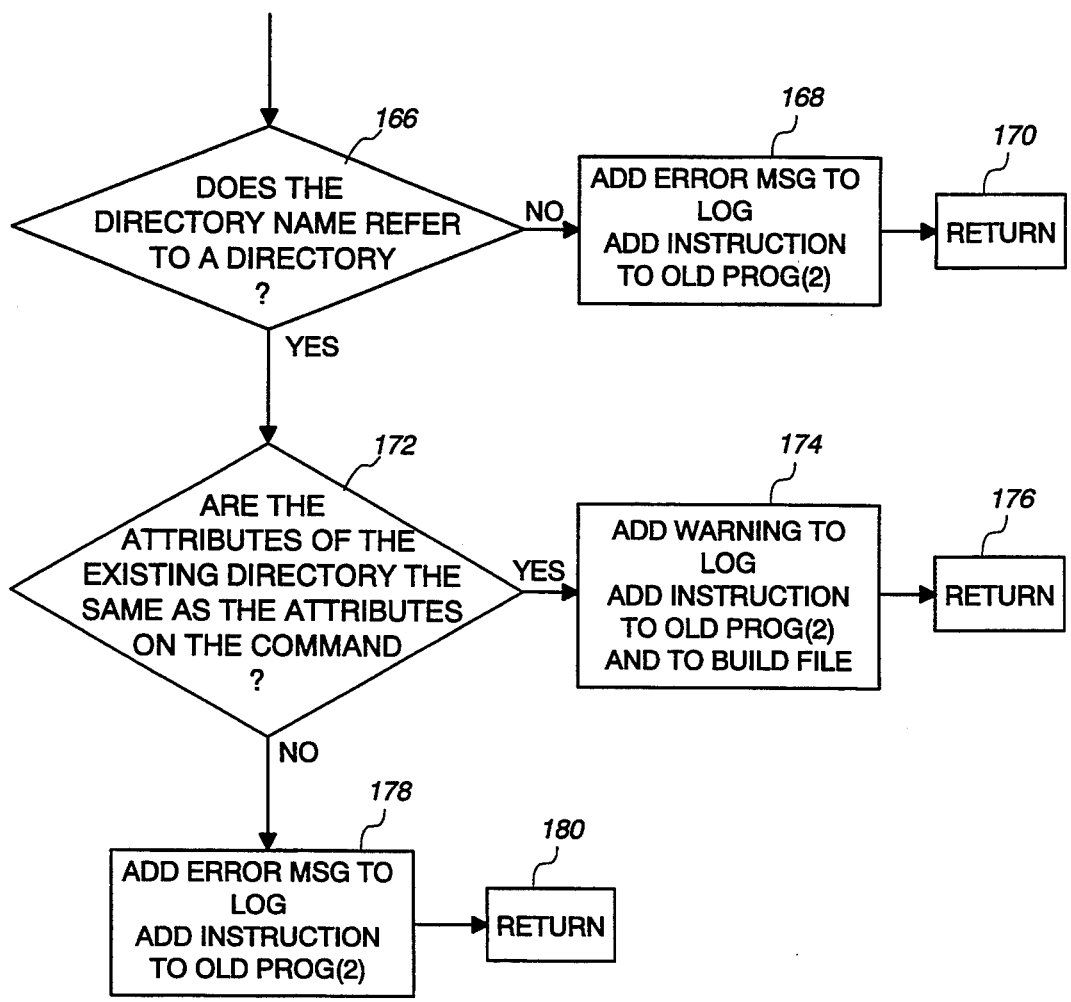

FIGS. 8A-8C illustrate the operation of the directory subroutine. The directory function 84 creates a directory on the client, using the data that is in the dir command. At step 150, the directory subroutine begins. At step 152, the directory subroutine checks to see if the parent directory name contains a non-directory. If so, an error message is added to the log file 104 and the instruction is added to the old_prog file 56 at step 154. Subsequently, at step 156 the subroutine for the directory returns to the interp_1 program.

If, however, all parts of the parent directory name that exist are directories, then the directory subroutine checks at step 158 to see whether or not the parent directory exists. If the parent directory does not exist, the command pends and at step 160, the instruction is added to the wait file 198. At step 162, the directory subroutine then returns to the calling program.

If, however, the parent directory does exist, then at step 164 the subroutine checks to see whether or not the directory name exists. If the directory name does exist, then the directory proceeds to FIG. 8B, at which point the subroutine checks at step 166, to determine if the directory name refers to a directory.

If the directory name does not refer to a directory, at step 168 an error message is added to the log file 104 and the instruction is added to the old_prog file 56. At step 170, the subroutine returns to the calling program.

If, however, the directory name does refer to a directory, then at step 172 the subroutine determines whether or not the attributes of the existing directory are the same as the attributes on the dir command. If these attributes are the same, then at step 174 a warning is added to the log file 104, this instruction is added to the old_prog file 56 and the command is added to the build file 148, whereupon the subroutine returns to the calling routine at step 176.

If, however, the attributes are not the same, then an error message is added to the log file 104 and the instruction is added to the old_prog file 56 at step 178 and upon completion, returns to the calling program at step 180.

Returning now to FIG. 8A, at step 164 the check determines whether or not the directory name exists. If it does not exist, the subroutine continues at step 181 to the program shown in FIG. 8C, where, at step 182, the directory subroutine determines whether or not the parent directory can be accessed by the programmer of the dir command (refer to Table 9). If the parent directory cannot be accessed by this programmer, at step 184 an error message is added to the log file 104 and the instruction is added to the old_prog 56 and then the routine returns at step 186.

If, however, the parent directory can be accessed by the user and group of the programmer of the dir command, at step 188 the subroutine asks whether or not the owner and the group for the directory exist on the system. If the owner and the group for the directory do not exist on the client, at step 190 an error message is added to the log file 104 and the instruction is added to the old_prog file 56, whereupon the subroutine returns at step 192 to the calling program.

If the owner and the group for the directory do exist on the system, as determined at step 188, the program at 194 completes a number of tasks. At 194, the directory is created, the attributes of the directory are changed to match attributes stated in the dir command, the instruction is added to the old_prog file 56, the instruction is also added to the log 104, and the instruction is added to the build file 148, signifying that it is a command which has been completed. After completion of step 194, the program returns to the calling program at step 196.

Returning again to FIG. 6, if the interp_1 subroutine determines that the instructions are not a copy instruction, a refresh instruction or a directory instruction, it proceeds to step 86 where it is determined whether or not the instruction is a remove file instruction, remove directory instruction or a remove-all instruction. These are rm_file, rm_dir and rm_all. If the interp_1 subroutine determines that it is a remove instruction, the remove subroutine is called at step 88.

Figure 9B:
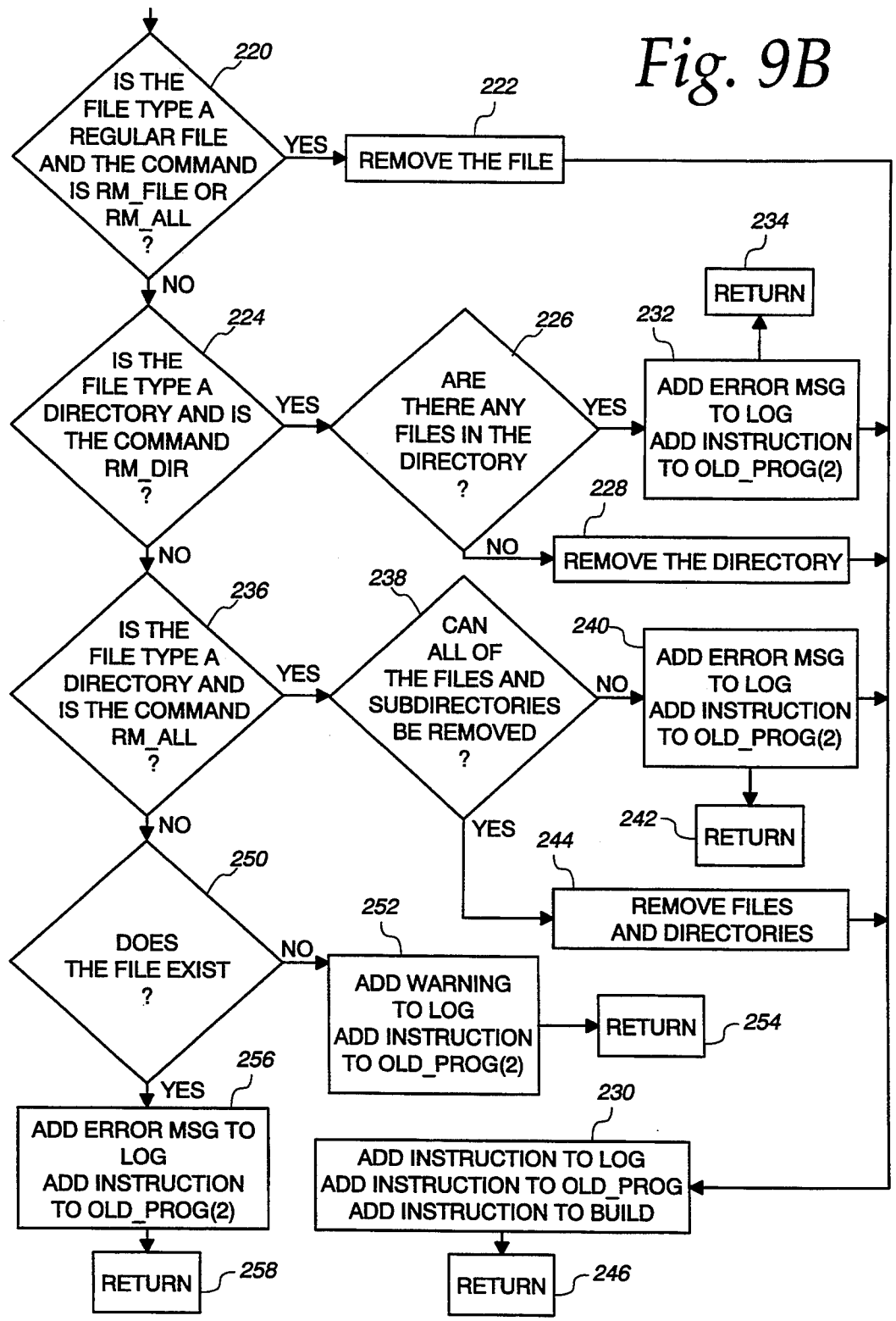

FIGS. 9A and 9B illustrate the operation of the remove subroutine. The remove subroutine begins at step 200, whereupon at step 202 the remove subroutine checks whether or not the parent directory exists. If the parent directory does not exist, at step 204 a warning is added to the log file 104 and the instruction is added to the old_prog file 56, upon which time it returns at step 206.

If, however, the remove subroutine does determine that the parent directory exists, at step 202 the subroutine proceeds to step 208, where it is checked to see whether or not it is a directory. If it is not a directory, at step 210 an error message is added to the log file 104 and the instruction is added to the old_prog 56 and returns at step 212.

If it is a directory, however, at step 214 a check is made to determine whether or not the programmer can delete files from the parent directory. If the programmer does not have the ability or authorization to delete files from the parent directory, at step 216 an error message is added to the log file 104 and the instruction is added to the old_prog file 56 and returns at step 218.

If the programmer does have authorization to delete files from the parent directory, as determined at step 214, the subroutine continues to step 220, shown in FIG. 9B. In step 220, it is determined whether or not the file type is a regular file and whether the command is rm_file or rm_all. If it is, at step 222 the file is removed. At step 230, the command is added to the log file 104, the old_prog file 56 and the build file 148. It continues to step 246 where it returns to the calling routine.

If, however, the file type is not a regular file or the command is not a rm_file or a rm_all file, then at step 224 a check is made to determine if the file type is a directory and whether or not the command is a rm_dir file. If the file type is a directory, and the command is an rm_dir command, then at step 226 a determination is made to see whether or not the directory is empty. If empty, the directory is removed at step 228. At step 230, the command is added to the log file 104, the old_prog file 56 and the build file 148. It continues to step 246 where it returns to the calling routine.

If there are, however, files in the directory, an error message is added to the log file 104 and the instruction is added to the old_prog 56 at steps 232 and returns at step 234. If the file type is not a directory or the command is not rm_dir, the routine proceeds to step 236, where a check is made to determine if the file type is a directory and if the command is an rm_all command. If yes, the subroutine proceeds to step 238 and a determination is made as to whether or not all of the descendant files and the subdirectories can be removed.

If they cannot be removed, at step 240 an error message is added to the log file 104 and the instruction is added to the old_prog 56, whereupon the subroutine returns at step 242. If the decision at step 238 is yes, at step 244 the files and the directories are removed. At step 230, the command is added to the log file 104, the old_prog file 56 and the build file 148. It continues to step 246 where it returns to the calling routine.

If it was determined at step 236, however, that the file type was not a directory or the command was not an rm_all command, then at step 250 it is determined whether or not the file exists. If the file does not exist, at step 252 a warning is added to the log file 104, the instruction is added to the old_prog file 56, and the subroutine returns at step 254.

If the file does exist at step 250, an error message is added to the log file 104 and the instruction is added to the old_prog file 56 at step 256 and returns at step 258.

Returning again to the interp_1 subroutine, as shown in FIG. 6, if it has been determined that the command is not a copy or a refresh command, is not a dir command, and is not a remove instruction, then step 90 determines if the command is an execute command. If there is an execute instruction at step 90, the execute subroutine is called at step 92.

The execute subroutine is shown in FIG. 10. The execute routine begins at step 260. At step 262, the file to be executed is transferred from the host to the client. At step 270 the subroutine; (1) executes the program listed in the file, (2) sends the appropriate output to the host log, (3) puts the remaining output into a file on the client, and (4) puts error messages into a file on the client. Once these steps have been completed as shown in the box 270, the subroutine proceeds to step 272 to determine whether or not the exit status indicates and error.

If the exit status indicates an error, an error message is added to the log file 104 at step 274, at step 278 the instruction is added to the old_prog 56, and at step 279 it returns to the calling routine. If there are no error messages, then at step 276 the instruction is added to the log file 104 and the build file 148. Then at step 278 the instruction is added to the old_prog file 56 and at step 279 returns to the calling program.

Another feature of the present invention is the ability to check the current status of the host files specified by the copy, refresh and execute commands listed in the library. An update library utility (update), updates the commands in the library with the maintain option (-m). See TABLES 1 and 2. It detects errors in the copy, refresh, and execute commands caused by a change in the status of the host file. It also loads the current station label definitions into the library. The present invention executes the update utility at the times specified by the workgroup leader and prior to block 48, update client, started by a programmer on the host.

Figure 11:
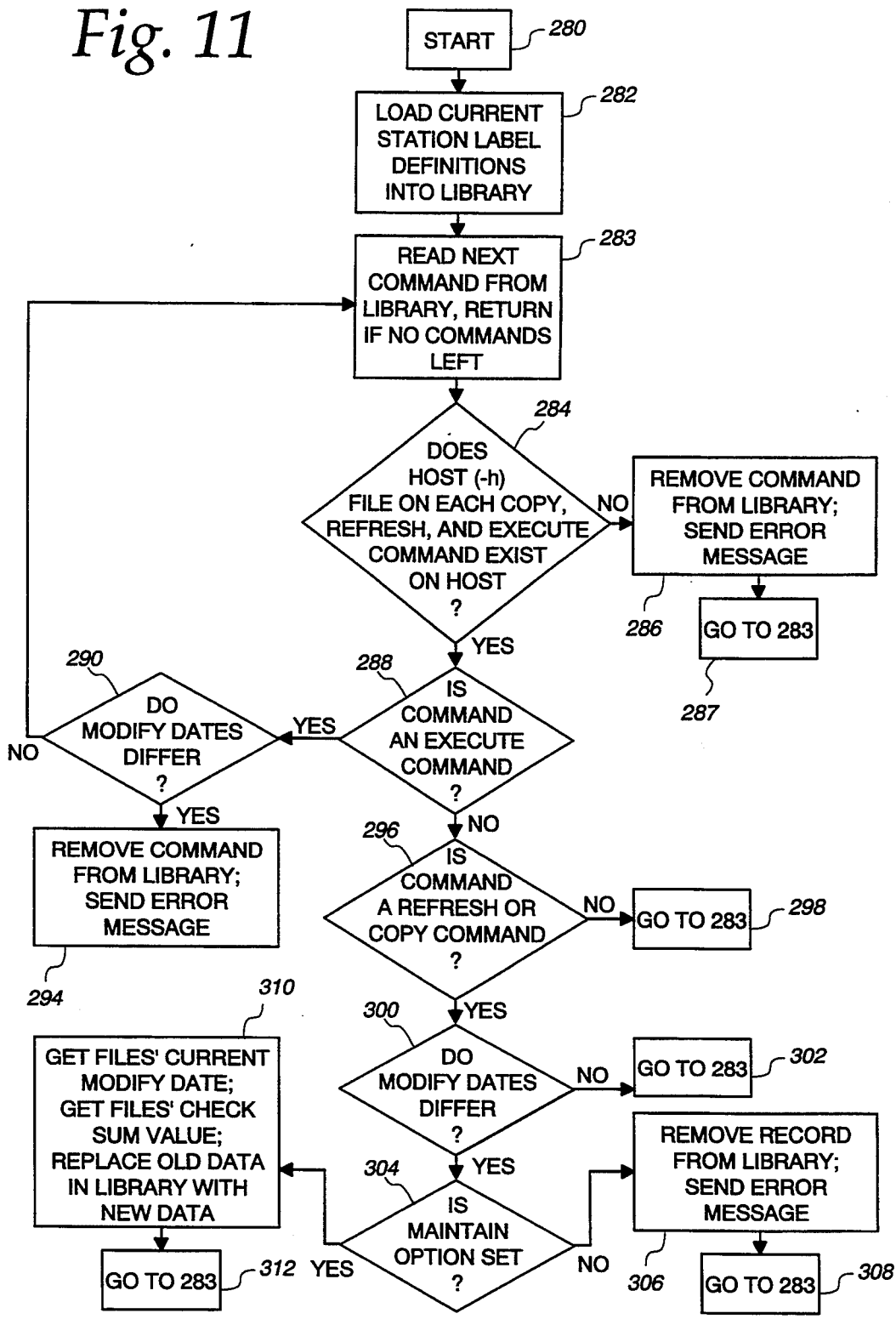
FIG. 11 is a flow diagram of a program update program module.

As shown in FIG. 11, the update utility starts a subroutine at step 280. At step 282, the command loads the current station label definitions into the library. Once the current station label definitions have been loaded, the subroutine reads the next command from the library at step 283, and returns if no commands remain. The subroutine then determines whether or not the host file in each copy, refresh and execute commands exist on the host at step 284. If the host files in each copy, refresh and execute commands do not exist on the host, then these commands are removed from the library and an error message is sent to the programmer at step 286, whereupon the subroutine at step 287 goes to step 283 to read the next command.

If, however, the host files in each copy, refresh and execute commands do exist on a host, then at step 288 the check is made to determine whether or not the command is an execute command. If the command is an execute command, at step 290 the subroutine determines whether or not the host file's modify date in the command differs from the file's actual modify date. If the modified dates do not differ, then it is known that the file has not changed and the subroutine returns at step 283 to read the next command.

If, however, the modified dates do differ, then the command is removed from the library and an error message is sent at step 294. If it is determined at step 288 that the command is not an execute command, then the command is checked to determine whether or not it is a refresh or a copy command at step 296. If the command is not a refresh command or a copy command, then the program returns at step 298 to step 283.

If the command is a refresh command or a copy command, then at step 300 the subroutine determines whether or not the host file's modify date in the command differs from the file's actual modify date. If the modified dates do not differ, then the subroutine returns at step 302 to step 283.

If, however, the modified dates do differ, then the command is checked to determine whether or not the maintain option has been set at step 304. If the maintain option is not set, then at step 306 the record is removed from the library and an error message is sent. Upon completion of these tasks, the program returns at step 308 to step 283.

If it is determined, however, at step 304 that the maintain option is set, then at step 310 the subroutine gets the file's current modify day, gets the file's check sum value and replaces the existing command with a new command using the new data. The subroutine returns at step 312 to step 283.

The foregoing description of the invention has been presented for purposes of illustration and description. The workgroup organized network has been described in combination with regards to a few possible applications of the invention to illustrate the operation thereof. This description is not intended to limit the invention to the precise forms disclosed, however. Consequently, many modifications and variations are possible in light of the above teachings by those skilled in the art as expressed in the specification and the appended claims.

What is claimed:

1. A method of computer management automatically maintaining updated set-up configurations on multiple computers networked together with a computer network, the method comprising the steps of:

organizing a group of the multiple computers into at least one workgroup based upon the tasks, projects or departments of the users;

defining at least one computer as a host workstation for each workgroup;

using the host workstation, generating a workgroup specification defining the configuration of the computers in one of said workgroups and containing instructions;

maintaining for each workstation in said one workgroup a record of any of said instructions which have previously been executed; and enabling each workstation in said one workgroup to compare the workgroup specification instructions to the record of any of said instructions which have been executed previously, and then to execute those instructions in the workgroup specification that are new or that have not been executed successfully previously.

2. A method in accordance with claim 1 wherein the workgroup specification instructions include a file copy instruction, wherein each workstation copies the file if the instruction is not found in the record of previously executed instructions.

3. A method in accordance with claim 2 wherein the copy instruction is not executed, and is not added to the record of which instructions have been previously executed, if the file is to be copied into a designated directory and if the workstation does not contain a directory whose name matches the name specified.

4. A method in accordance with claim 2 wherein the copy instruction is not executed, and is not added to the record of which instructions have been previously executed, if the copying of the file violates security on the workstation.

5. A method in accordance with claim 2 wherein the copy instruction is a refresh instruction which is not executed, and is not added to the record of which instructions have been previously executed, if a file having the same name does not already exist on the workstation.

6. A method in accordance with claim 1 wherein the workgroup specification instructions include a directory creating instruction, and wherein each workstation creates the directory if the instruction is not found in the record of previously executed instructions.

7. A method in accordance with claim 6 wherein the directory instruction is not executed, and is not added to the record of which instructions have been previously executed, if the directory is to be created within a designated directory, and the designated directory does not exist on the workstation.

8. A method in accordance with claim 6 wherein the directory instruction is not executed, and is not added to the record of which instructions have been previously executed, if the creation of the directory violates security on the workstation.

9. A method in accordance with claim 1 wherein the workgroup specification instructions includes one or more instructions to remove files or directories or both, wherein each workstation executes the removal instructions, if the instruction is not found in the record of the previously executed instructions.

10. A method in accordance with claim 9, wherein the removal instruction is not executed if its execution would violate security, but wherein the removal instruction is added to the record of instructions which have been previously executed regardless of whether its execution was prevented by system security.

11. A method in accordance with claim 1, wherein the workgroup specification instructions include a program execution instruction and wherein each workstation causes the program to execute if the instruction is not found in the record of previously executed instructions.

12. A method in accordance with claim 1 wherein said enabling step enables each workstation to update itself without initiation by the host workstation.

13. A method in accordance with claim 12 wherein said enabling step is repeated periodically on each workstation in said one workgroup enabling each workstation to alter itself to match changes in the workgroup specification mandated by the host.

14. A method in accordance with claim 13 wherein said organizing step organizes plural groups of the multiple computers into plural workgroups based upon the tasks, projects or departments of the users.

15. A method in accordance with claim 14 wherein each of the multiple computers may be organized into several of the workgroups.

16. A method in accordance with claim 15 comprising the steps of adding one of the multiple computers to one of the workgroups, defining the added computer as an added workgroup workstation, and causing the workstation to copy the host set-up configuration from the host workstation to the added client workstation.

17. A method in accordance with claim 15 comprising the step of providing a log of the set-up configurations of each of the multiple computers and any changes to the set-up configurations performed by said updating step to accurately document and identify exactly what has been done to each of the multiple computers.

18. A method in accordance with claim 1 wherein the generating step includes generating a series of instructions that cause a directory tree, complete with directories and files, to be established on the computers in said one workgroup.

19. A method in accordance with claim 18 wherein said generating step also includes adding additional instructions as part of the workgroup specification.

20. A method in accordance with claim 18 wherein the generating step, when generating a series of instructions that cause a directory tree, complete with directories and files, can exclude certain files based upon their properties.

21. A method in accordance with claim 1 wherein the generating step includes generating a series of instructions that cause all the files in a record of files to be established on the computers in said one workgroup.

22. A method in accordance with claim 1 which includes the step of generating replacement instructions for the workgroup specification whenever elements of the configuration of the host machine referred to by instructions are altered, thereby causing the workgroup machines to reexecute the replaced instructions.

23. A method in accordance with claim 22 wherein the configuration element of the host machine is the modification date of a file whose name is referred to in an instruction that copies the file from the host computer to the computers in said one workgroup, whereby when the file is modified on the host computer, the modified file is transferred to each of the computers in said one workgroup by said enabling and executing step.

* * * * *